(12) United States Patent
Soderstrom et al.

(10) Patent No.: US 8,694,539 B2
(45) Date of Patent: Apr. 8, 2014

(54) SYSTEM AND METHOD FOR NAMING DIMENSION MEMBERS IN A DATA ANALYZING SYSTEM

(75) Inventors: Rick Soderstrom, Ottawa (CA); Bob Sparks, Gatineau (CA); Guillaume Senneville, Ottawa (CA); Phil Archdeacon, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 1437 days.

(21) Appl. No.: 11/553,771

(22) Filed: Oct. 27, 2006

(65) Prior Publication Data
US 2008/0104068 A1      May 1, 2008

(51) Int. Cl.
*G06F 17/30*     (2006.01)

(52) U.S. Cl.
USPC .......................................................... 707/771

(58) Field of Classification Search
USPC ................................. 707/3–6, 100–102, 771
See application file for complete search history.

(56) References Cited

U.S. PATENT DOCUMENTS

| 7,051,025 B2* | 5/2006 | Kan et al. ........................... 707/6 |
| 7,181,450 B2* | 2/2007 | Malloy et al. ..................... 707/4 |
| 7,194,465 B1* | 3/2007 | MacGregor ....................... 707/6 |
| 7,366,730 B2* | 4/2008 | Greenfield et al. ........... 707/102 |

* cited by examiner

*Primary Examiner* — Huawen Peng
(74) *Attorney, Agent, or Firm* — Shumaker & Sieffert, P.A.

(57) ABSTRACT

A member naming system is provided for naming members of a dimension in a data analyzing system having a receiver for receiving a pattern. One example of the dimension is a time dimension containing time periods. The pattern has a sequence of pattern components for defining a name. A time period is defined by a start time, an end time, a relationship and a level in a single time hierarchy. The time period naming system further has an interpreter for interpreting the sequence of pattern components, and a generator for generating the time period name based on the interpretation of the sequence of pattern components within a context of the relationship of the time period in the time hierarchy.

15 Claims, 5 Drawing Sheets

SYSTEM AND METHOD FOR NAMING DIMENSION MEMBERS IN A DATA ANALYZING SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of Invention

The present invention relates to a system and method for naming dimension members. More particularly, the present invention relates to a system and method for naming members of a hierarchical dimension in a data analyzing system.

Business decisions and corporate-client relationships have evolved over the past decades. New tools for processing the wealth of data and information have been deployed to exploit business data. Knowledge-based decision support systems have become highly specialized. In addition to relational databases, business managers and decision makers now look to decision support systems (DSS) and other advanced analytical tools in the hope of obtaining a competitive edge.

Various data analytical applications are available to assist business users to examine their business data. Business data, such as financial data and operational data, is typically stored in a data store relative to time information. Using a data analyzing application, business users can navigate through data organized in a dimension, for example, a time dimension, relevant to their business. For example, a user may be interested in viewing data from the previous quarter, last January or last year.

In a DSS, the basic capabilities of querying and reporting functions is extended by On-line Analytical Processing (OLAP), allowing a robust multidimensional understanding of the data from a variety of perspectives and hierarchies from a multidimensional viewpoint OLAP operations such as drill-down, roll-up and pivot provide insights into business growth, spending, and sales patterns that would simply not be possible otherwise. Other OLAP functionality includes operations for ranking, moving averages, growth rates, statistical analysis, and "what if" scenarios. This discovery process may be further automated in data mining applications, so that trends and patterns can be retrieved with minimal user input. The patterns, for example, may consist of subtle regularities that cross hierarchical and/or dimensional boundaries and, as such, would be less likely to be discovered otherwise.

Multidimensional databases used in DSS typically view data as a multi-dimensional structure called a cube.

Dimensions, as an essential and distinguishing concept in multidimensional databases, are used for selecting and aggregating data at the desired level of detail. Time is often a dimension used in multidimensional databases, and unlike most other dimensions is based on a single linear scale. A dimension is organized into a hierarchy composed of numerous levels representing required details. Dimension thus is a structural attribute comprising a list of members. The members of each level are a similar type of data. For example, a model can define time as both fiscal year and calendar year. Multiple hierarchies may share one or more common lowest levels—for example, day and month—with different higher level grouping, for example fiscal quarter and year and calendar quarter and year.

There are various ways of dividing dimensions such into levels and into hierarchies of members.

Some dimensions, such as a time dimension, consist of portions of a continuous measurement. Time dimensions frequently (but not always) reflect conventional calendars and time designations. For example, time may be divided by day, week, calendar week, business week (less than 7 days), calendar month, lunar or manufacturing month (4 or 5 week month), lunar or manufacturing quarter (13 week), semester and year.

Also, there are many additions and variations of time dimension divisions into basic units and various summary levels on top of this basic unit set. As an example, companies frequently start their fiscal year, quarter and month differently than those conventional calendar divisions. For example, when a user looks for the impact of a business event that occurred last February, the user needs to know if last February was Q4 or Q1 in their business calendar. Also, some business calendars have complex hierarchies that are difficult to navigate. For example, in a weekly manufacturing calendar, it is difficult to know if week 13 falls in Q1 or Q2. Other companies may also see time differently than the real world time. For example, a broadcast company in Canada has a 28-hour day, beginning at midnight on the east coast and ending at midnight on the west coast. Further, time dimension hierarchies are often complicated by the overlap of different periods. In particular, the weekly boundaries do not coincide with the month, quarter and year boundaries.

This problem may be exacerbated by the localization of the DSS where naming members such as time periods may be unique to a region or religion. For example, the Hebrew calendar adds an extra 29 day month, seven times every 19 years so that the calendar stays approximately in line with the seasons The Chinese calendar also has a similar but different method of adding a month. In addition, many calendar systems define the beginning of a week, and sometimes the beginning of a holiday, based on one particular day having special religious significance (e.g., Friday for Muslims, Saturday for Jews, and Sunday for Christians). For a time period on the single linear time scale, when localized in different regions or religion, may result hundreds or thousands of different formats depending on a hierarchies or levels. Other conventions vary from locale to locale even when the calendar is the same, for example the ordering of day, month and year in a date or tie use of comma and period in numbers.

Therefore, it is not desirable for a user to have to explicitly name each of potentially thousands of members such as time periods. There is a challenging demand for flexibility, convenience and translatability in specifying dimension members such as time periods to be used, and the methods of generically naming these periods in multiple calendars and multiple Locales.

Existing computer languages, operating systems and applications may provide a set of aids to name dates. However, existing systems and methods are incomplete when naming time periods. They do not allow easy naming of non-standard time periods such as: "Q3 FY05" or "Year to date with daily granularity for Mar. 26, 2005".

There are conflicting needs when displaying names of members. For example in context, the name of a City might be simply Springfield, but out of context, the name may need to be more completely and uniquely expressed as Springfield, Ill.

In a general hierarchical system the easiest way to provide a complete and unique name is to concatenate the individual names of all ancestors of the period in question. This approach, while leading to a unique name, creates cumbersome names. For example, in a system of years, quarters, months, weeks and days, the generated unique name of a day using the continuation of ancestors approach would be:

2005, Q3, August, Week 2, Day 13.

In a standard Gregorian calendar, a common friendly and unique name would leave out the quarter and week portions and would look like this:

Aug. 13, 2005

In addition, in a general system of arbitrary levels, there is not an easy set of rules which can be applied to name members in the way desired and expected by the end users.

Therefore, there is an unmet need to provide novel systems and methods which allow the generation of clear and expected member Names for any customized business calendar.

BRIEF SUMMARY OF THE INVENTION

It is an object of the invention to provide a system and method for generically naming members in a dimension, such as time periods in a time dimension that allows easier creation of the time period name for a data analyzing system in any customized calendar.

In accordance with one aspect of the present invention there is provided a method of generating dimension member names in a data analyzing system comprising the steps of: receiving a pattern having a sequence of pattern components, and receiving a dimension member of a dimension, the dimension having a dimension hierarchy, the dimension member having a context; interpreting the sequence of pattern components received by the receiver; and generating a dimension member name based on the interpretation of the sequence of pattern components within the context of the dimension member in the dimension hierarchy.

Preferably, the context includes an identifier, an ancestor, and a level in the dimension hierarchy.

Preferably, the context includes an ordered set of siblings.

Preferably, the dimension is an ordered dimension, and each of the dimension members represent a portion of a continuous measurement.

Preferably, the ordered dimension is a time dimension with a member having a start time and an end time.

Preferably, the pattern further comprises seed data names.

Preferably, the pattern components are selected from the group consisting of a fiscal year, a period-to-date, a period number relative to the parent, a period number relative to an ancestor level, a member identifier, a level in which a time period resides, an identifier of the level, an identifier of an ancestor period, a cyclic member name, a literal text, a date format, and a combination thereof.

In accordance with another aspect of the present invention there is provided method of generating dimension member names in a data analyzing system comprising the steps of: receiving a pattern having a sequence of pattern components, and receiving a dimension member of an ordered dimension, the ordered dimension having a dimension hierarchy; the dimension member having a context and being in sequence in a level in the dimension hierarchy; the context including an identifier, a parent member, an ordered set of siblings and the level; interpreting the sequence of pattern components received by the receiver; and generating a dimension member name based on the interpretation of the sequence of pattern components within the context of the dimension member in the dimension hierarchy.

In accordance with another aspect of the present invention there is provided a dimension naming system for generating dimension member names in a data analyzing system, the dimension naming system comprising: a receiver for receiving a pattern having a sequence of pattern components, and receiving a dimension member of a dimension, the dimension having a dimension hierarchy, the dimension member having a context; an interpreter for interpreting the sequence of pattern components received by the receiver; and a generator for generating a dimension member name based on the interpretation of the sequence of pattern components within the context of the dimension member in the dimension hierarchy.

Preferably, the context includes an identifier, a parent and a level in the dimension hierarchy.

Preferably, the dimension naming system according to claim 9, wherein the context includes an ordered set of sibling Members Preferably, the dimension member belongs to an ordered dimension, and the dimension member is part of an ordered set of siblings.

Preferably, the ordered dimension is a time dimension with a member having a start time and an end time.

Preferably, the generator further comprises a period name generator.

Preferably, multiple patterns exist to produce multiple names for different purposes.

Preferably, the names include a long name, and a short name.

Preferably, the dimension naming system further comprises seed data names.

Preferably, the pattern is selected from the group consisting of a fiscal year, a period-to-date, a period number relative to the parent level, an alpha numeric name, a name of a level in which the time period resides, a name for a level, a name of an ancestor period, a name of a cyclic member, and a combination thereof.

In accordance with another aspect of the present invention there is provided a storage medium readable by a computer encoding a computer program for execution by the computer to carry out a method for generating a dimension member name in a data analyzing system, the computer program comprising: code means for receiving a pattern having a sequence of pattern components, and receiving a dimension member of a dimension, the dimension having a dimension hierarchy, the dimension member having a context; code means for interpreting the sequence of pattern components received by the receiver; and code means for generating a dimension member name based on the interpretation of the sequence of pattern components within the context of the dimension member in the dimension hierarchy. This summary of the invention does not necessarily describe all features of the invention.

BRIEF DESCRIPTION OF THE SEVERAL VIEWS OF THE DRAWINGS

These and other features of the invention will become more apparent from the following description in which reference is made to the appended drawings wherein.

DETAILED DESCRIPTION OF THE INVENTION

Figure 1:
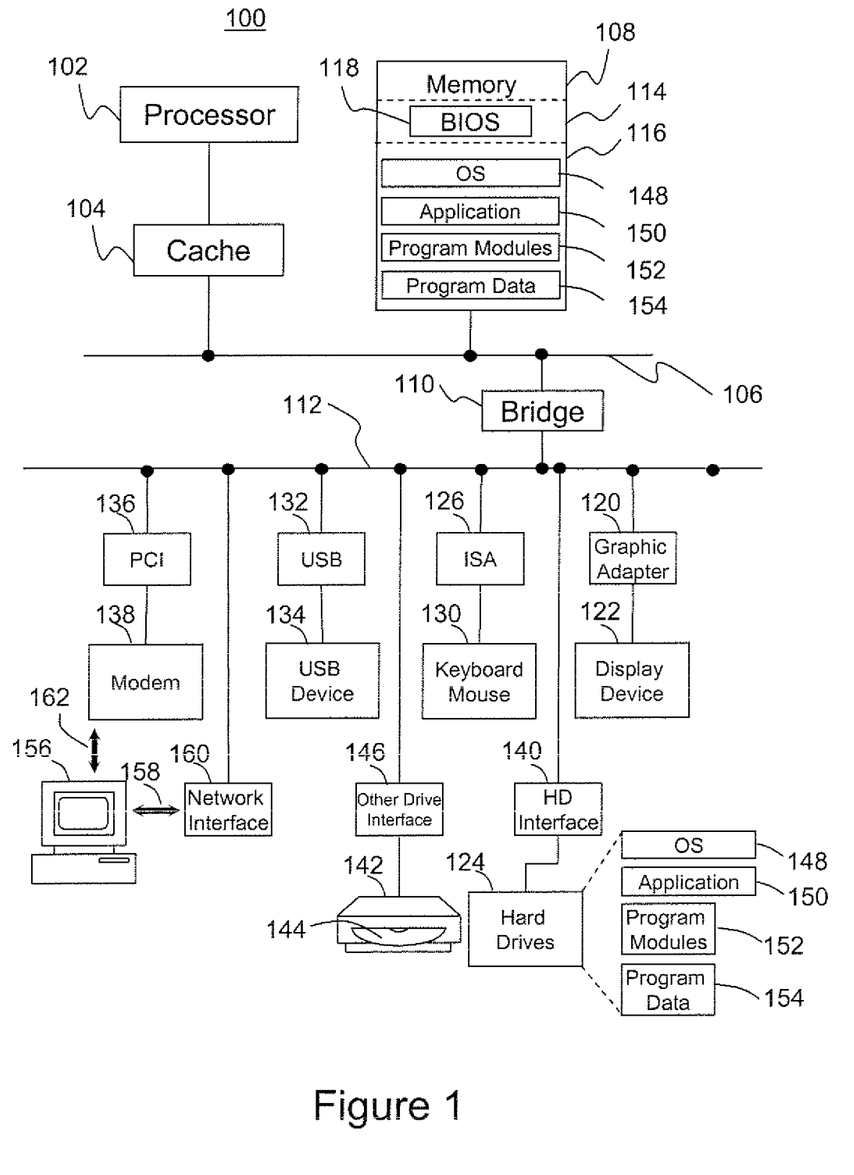
FIG. 1 is a block diagram showing a computer system that uses a method for naming dimension members in accordance with an embodiment of the invention.

With reference to FIG. 1 an exemplary system 100 for implementing the invention may be, for example, one of the general purpose computers. The system 100 includes processor 102, which in the exemplary embodiment are each connected to cache memory 104, the cache 104 is connected in turn to a system bus 106 that couples various system components.

Also connected to system bus 106 are a system memory 108 and a host bridge 110. Host bridge 110 connects I/O bus 112 to system bus 106, relaying and/or transforming data transactions from one bus to the other. The system bus 106 and the I/O bus 112 may be any of several types of bus structures including a memory bus or memory controller, a peripheral bus, and a local bus using any of a variety of bus architectures. The system memory includes read-only memory (ROM) 114 and random access memory (RAM) 116. A basic input/output system 118 (BIOS), containing the basic routines that help to transfer information between elements within the personal computer 100, such as during start-up, is stored in ROM 114.

In the exemplary embodiment, the system 100 may further include a graphics adapter 120 connected to I/O bus 112, receiving user interface information for display device 122. A user may enter commands and information into the system 100 through input devices 130 such as a conventional mouse, a key board, or the like. Other input devices 134 may include a microphone, joystick, game pad, satellite dish, scanner or the like. The devices may be connected via an Industry Standard Architecture (ISA) bridge 126, or a Universal Serial Bus (USB) bridge 132 to I/O bus 112, respectively. PCI device such as a modem 138 may be connected to the I/O bus 112 via PCI bridge 136.

The exemplary system 100 may further include a hard disk drive 124 for reading from and writing to a hard disk, connected to the I/O bus via a hard disk interface 140, and an optical disk drive 142 for reading from or writing to a removable optical disk 144 such as a CD-ROM or other optical media. The hard disk drive 124, magnetic disk drive, and optical disk drive 142 may be connected to the I/O bus 112 by a hard disk drive interface 140, and an optical drive interface 146, respectively. The drives and their associated computer-readable media provide non-volatile storage of computer readable instructions, data structures, program modules and other data for the system 100. Although the exemplary environment described herein employs a hard disk 124 and a removable optical disk 144 it should be appreciated by those skilled in the art that other types of computer readable media, which can store data that is accessible by a computer, such as magnetic cassettes, flash memory cards, digital video disks, Bernoulli cartridges, random access memories (RAMs), read-only memories (ROMs) and the like, may also be used in the exemplary operating environment.

A number of program modules may be stored on the hard disk 124, optical disk 144, ROM 118 or RAM 116, including an operating system 148, one or more application programs 150, other program modules 152 and program data 154.

The exemplary system 100 may operate in a networked environment using logical connections to one or more remote computers, such as a remote computer 156. The remote computer 156 may be another personal computer, a server, a router, a network PC, a peer device or other common network node, and typically includes many or all of the elements described above relative to the exemplary system 100. The logical connections depicted in FIG. 1 include a network 158, for example, a local area network (LAN) or a wide area network (WAN). Such networking environments are commonplace in offices, enterprise-wide computer networks, Intranets and the Internet.

When used in a networking environment, the exemplary system 100 is connected to the local network 158 through a network interface or adapter 160. The exemplary system 100 may use the modem 138 or other means for establishing communications 162 over a wide area network such as the Internet. In a networked environment, program modules depicted relative to the exemplary system 100, or portions thereof, may be stored in the remote memory storage device. It will be appreciated that the network connections shown are exemplary and other means of establishing a communications link between the computers may be used.

The exemplary embodiment shown in FIG. 1 is provided solely for the purposes of explaining the invention and those skilled in the art will recognize that numerous variations are possible, both in form and function. For instance, the exemplary system 100 may also include a magnetic disc drive, and numerous other optional components. All such variations are believed to be within the spirit and scope of the present invention. The exemplary system 100 and the exemplary figures below are provided solely as examples for the purposes of explanation and are not intended to imply architectural limitations. In fact, this method and system can be easily adapted for use on any programmable computer system, or network of systems, on which software applications can be executed.

Figure 2:
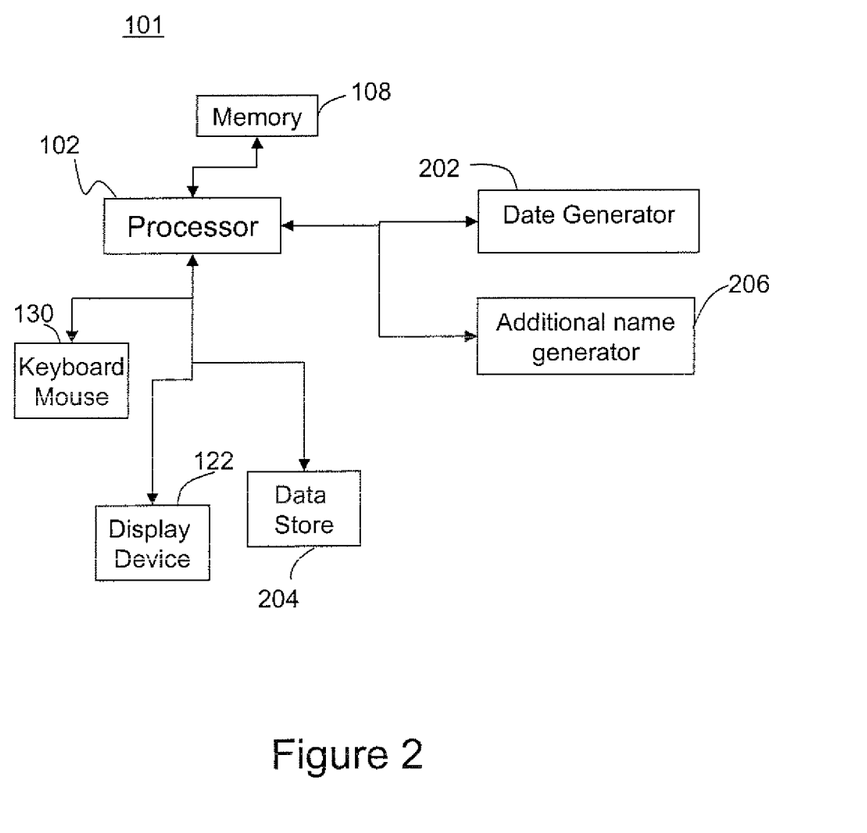
FIG. 2 is a logical block diagram of the dimension member naming system.

FIG. 2 is a logical block diagram of a dimension member naming system using a time period naming system 101 as an example, when used in an embodiment of the present invention. The processor 102 is in communication with memory 108 as well as one or more date generators 202, which may be a software module, an Application Specific Integrated Circuit (ASIC), or Field-Programmable Gate Array (FPGA). The date name generator 202 generates short period name, long period name, and period-to-date name Additional name generator 206 may be present as needed. The processor 102 is connected to one or more data store 204, various data input devices, such as the keyboard and/or mouse 130, display device 122 such as a monitor.

Figure 3:
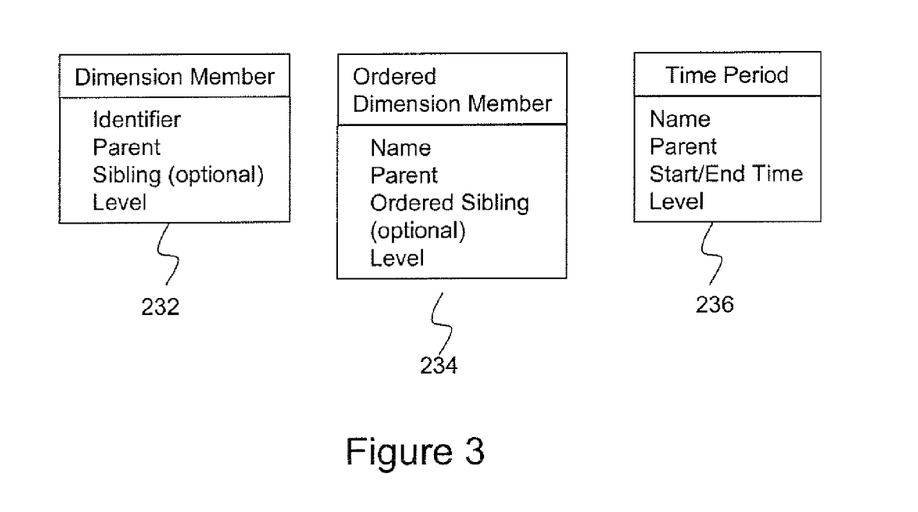
FIG. 3 shows examples of dimension members.

Referring to FIG. 3, dimension member 232 may have a context which comprises an Identifier, a parent, and a level in a hierarchy, optionally an ordered set of siblings may also be included. The term "Identifier" is intended to include an identifying name describing the member in the context of its parent and is unique among its siblings.

Some dimension members are ordered dimension members 234 for which there is an ordering of the children of every parent. A specific example of the ordered dimension is time dimension 236. The ordering of a time period within each level is defined by a start time and an end time.

Figure 4:
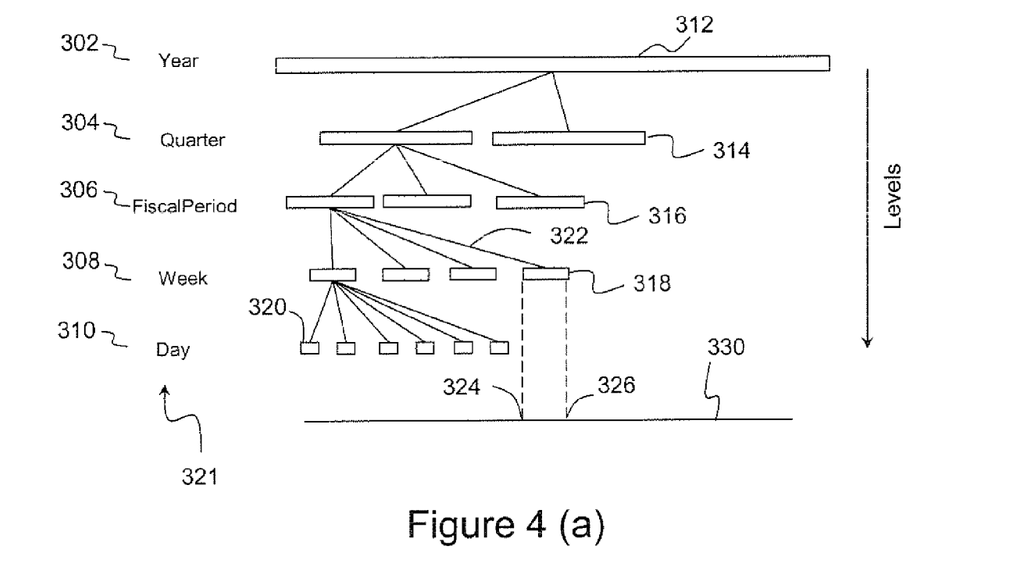
FIG. 4(a) shows different dimension levels with corresponding members.
FIG. 4(b) depicts members being ordered by a sequence number in relation to a higher level members.
FIG. 4(c) shows an example of a pattern.

Referring to FIGS. 4(a) and (b), a plurality of member levels in a hierarchy, for example, Levels (302, 304, 306, 308, 310) is defined. Time periods (312, 314, 316, 318, 320), for example, occur in the Levels.

Members are arranged in levels. The levels have attributes such as; Level Identifier, Language Text Id 321, Level Number 406 (numeric, (N, N+1, N+2, . . . , N+m) in ascending sequence from the most coarse to the most finely grained, indicating the position in a Level Hierarchy. Summarization of members such as time periods in one level 308 to time periods in higher levels 306 may be expressed as a set of child-parent relationships 322. Hence, time periods 316 in the FiscalPeriod Level 306 may be considered as parents to the time periods 318 in Week Level 308. Time periods 318 in the Week Level 308 may in turn be considered as parents to the time periods 320 in the Day Level 310. In this context, time periods 316 in the FiscalPeriod Level 306 may be considered as the ancestors of the time periods 320 in the Day Level 310. Each successive level 308 may represent a summarization of the next lower level 310. Higher levels 304 represent coarser grain than lower levels 306. The numbers of members in each level therefore tend to be lower in higher levels.

Members may therefore form a tree. As shown in FIG. 4(a), time periods form a tree. The time periods are not only characterized through the hierarchies in the time tree, they are also characterized by the Levels in which they reside Members of a dimension level, share common properties. For example time periods of a time level have common properties. In this regard, a calendar year and a manufacturing year distinguish from each other and are different levels as they have different properties. For example, a calendar year may have 12 months as its children, while a manufacturing year may consist of 13 four-week periods.

A custom level may therefore be readily defined in a member tree hierarchy. For example, the Level FiscalPeriod 306 represents a custom defined Level.

A unique time period 318 may be defined by using a start-time 324, an end time 326 and the level 308 in which the period occurs. When considered in relation to the single linear time scale 330, this defines a time period irrespective of the language, region, or other extrinsic properties. The time periods may thus include attributes such as: level identifier 308, start time code 324, end time code 326, and their relationship to parent levels 322. A time period also has an identifier. For example, a time period in the Month level under the year 2004 may have the identifier Jan which represents a unique identifier within its parent but may not be unique among all members because there may also be a period with the identifier Jan under the Year 2005.

Referring to FIG. 4(b), the exemplary time period naming system may compute a sequence number (P1, P2) 408 which orders each time period 410 in relation to its sibling periods in respect to any one of its ancestor time periods in a higher level 412.

Each time period represents a specific portion of an underlying single linear time scale. That portion is specified by the fields Start Time and End Time.

In analyzing business data, users are often interested in both the quantity in a period and the cumulative value for that period for either some fixed number of consecutive periods or relative to the start of any one of its parent or ancestor periods.

A set of special members in the zero-th level may be defined. Using the exemplary time period naming system, these zero-th level time periods are aggregations of other time periods, and are commonly used for period-to-date or rolling-sum totals. There are no restrictions on the content of these time periods and no requirements of a continuous time span or ordering of periods in the zero-th level.

A time period may have a plurality of different names based on the application requirements, for example but not limited to, a short name and a long name. The short name may be non-unique, for example, "Jan 15". The long name is assumed to be unique, completely self-describing, and contains a broader context, for example, "FY 2004, Quarter 1, January, Week 3, January 15".

In accordance with one embodiment of the present invention, additional member names such as time period names may be added for different contexts as dictated by the display requirements of an application.

In accordance with another embodiment of the present invention, d member name generator such as the date generator 202 may generate short name, long name, short period-to-date name, long period-to-date name or any additional names based on patterns. The pattern can be either pre-defined for standard calendar such as the Gregorian calendar or a manufacturing calendar, or specified by the user for standard and customized calendars.

A pattern is defined by a sequence of pattern components. The pattern, for example, when interpreted in the context of the time period as discussed above, is used to define the time period names. Referring to FIG. 4(c), the pattern 422, for example LLNN, comprises a sequence of pattern components 424, the first two letters (LL) are one pattern component and the next two letters (NN) are another pattern component, in the above example of LLNN. Pattern components are represented by symbols. In the above example the pattern 422 LLNN is made up of two pattern components 424 having the symbols LL and NN. In this example LL represents the level in which the member occurs and NN represents the relative number of the member in the ordered set of sibling members in relation to their common parent.

The time period naming system 101 may define a set of seed data names, for example, a short name of levels, a long name of levels used in common calendars, Gregorian calendars and manufacturing calendars for the system. For example:

| Level Name Type | language_cd | Short name | Long name |
| --- | --- | --- | --- |
| Year_PPP | EN | YTD | Year to Date |
| Year_GGG | EN | Y | Yearly |
| Year_LLL | EN | Y | Year |
| Quarter_PPP | EN | QTD | Quarter to Date |
| Quarter_GGG | EN | Q | Quarterly |
| Quarter_LLL | EN | Q | Quarter |
| Fiscal_PPP | EN | FTD | Fiscal to Date |
| Fiscal_GGG | EN | M | Fiscal |
| Fiscal_LLL | EN | M | Fiscal |
| Week_PPP | EN | WTD | Week to Date |
| Week_GGG | EN | W | Weekly |
| Week_LLL | EN | W | Week |
| Day_PPP | EN | | |
| Day_GGG | EN | D | Daily |
| Day_LLL | EN | D | Day |

For example, if the short period name generator 206 generates "Q3" upon receiving the pattern "LLNN" for the third time period in the Quarter level (in respect to its parent period) from the input device 130, while the long period name generator 208 generates "Q3 2004" in response to the pattern "LLNN YYYY", and the period-to-date name generator 210 will generate "YTD Q3 2004" in response to the input pattern "PP LLNN YYYY".

Other predefined examples for the patterns and their corresponding period long name, period short name and period-to-date name at each level in the time hierarchy may include:

| Level | Short name Pattern | Example | Long Name Pattern | Example | To Date Period Pattern | Example |
|---|---|---|---|---|---|---|
| Year | YYYY | 2004 | YYYY | 2004 | n/a | None |
| Quarter | LLNN | Q3 | LLNN YYYY | Q3 2004 | PP LLNN YYYY | YTD Q3 2004 |
|  |  |  |  |  |  | YTD Q3 2003 |
| Month | MMM | Dec | MMM YYYY | November 2004 | PP MMM YYYY | YTD November 2004 |
|  |  |  |  |  |  | YTD November 2003 |
| Week | 'Week' NN3 | Week 48 | 'Week' NN3 ',' YYYY | Week 48, 2004 | PP 'Week' NN ',' YYYY | YTD Week 48 2004 |
|  |  |  |  |  |  | QTD Week 48, 2004 |
|  |  |  |  |  |  | MTD Week 48, 2004 |
| Day | MMM d | Dec 9 | MMM d',' YYYY | Dec. 9, 2004 | PP MMM d, YYYY | YTD Dec. 9, 2004 |
|  |  |  |  |  |  | QTD Dec. 9, 2004 |
|  |  |  |  |  |  | MTD Dec. 9, 2004 |
|  |  |  |  |  |  | WTD Dec. 9, 2004 |

Although the examples described above are based on examples using a Gregorian calendar and English language, a person skilled in the art would readily appreciate that the concept applies equally to any member of a dimension, and that the time period naming system would apply equally to other calendars and other languages that are based on a single linear time scale. It is possible to generate time period names, in other languages, or in other calendars, by interpreting a pattern with a sequence of pattern components, for a time period which is in a level and which has an identifier and is defined by a start time, an end time. In the above examples, three types of patterns, namely short name pattern, long name pattern and to period-to-date pattern, and five levels, from year to day, are defined for one language. The total number of patterns are therefore number of languages×number of types×number of levels.

To demonstrate the previous statement, here's how the member naming system in accordance with the present invention, exemplified by the time period naming system can easily apply equally to other calendars or other languages, for example, the above table may be defined for a French system using the same Level Name Type and a different language_id:

| Level Name Type | language_cd | Short name | Long name |
|---|---|---|---|
| Year_PPP | FR | AAJ | Année à ce jour |
| Year_GGG | FR | A | Annuel |
| Year_LLL | FR | A | Année |
| Quarter_PPP | FR | TAJ | Trimestre à ce jour |
| Quarter_GGG | FR | T | Trimestriel |
| Quarter_LLL | FR | T | Trimestre |
| Fiscal_PPP | FR | PFAJ | Période fiscale à ce jour |
| Fiscal_GGG | FR | PF | Période fiscale |
| Fiscal_LLL | FR | PF | Période fiscale |
| Week_PPP | FR | SAJ | Semaine à ce jour |
| Week_GGG | FR | S | Hebdomadaire |
| Week_LLL | FR | S | Semaine |
| Day_PPP | FR |  |  |
| Day_GGG | FR | J | Journalier |
| Day_LLL | FR | J | Jour |

Figure 5:
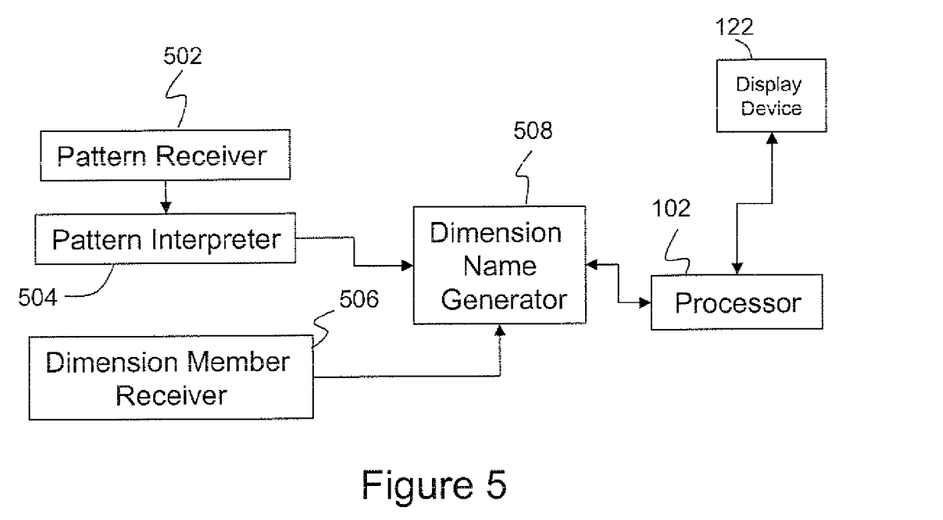
FIG. 5 shows a relationship between pattern receiver and the data store creator, the data integration module and a user input.

Referring to FIG. 5, a pattern receiver 502 receives a pattern with a sequence of pattern components for defining a dimension member, and dimension member receiver receives a dimension member with a context which has an identifier, an ancestor, and a level in a dimension hierarchy A pattern interpreter 504 interprets the sequence of the received pattern components. The dimension name generator 508 generates the dimension member name based on the interpretation of the sequence of pattern components within a context of the relationship of the dimension member in the dimension hierarchy.

After a standard calendar is generated, the names of Levels and the time periods may be customized.

Figure 6:
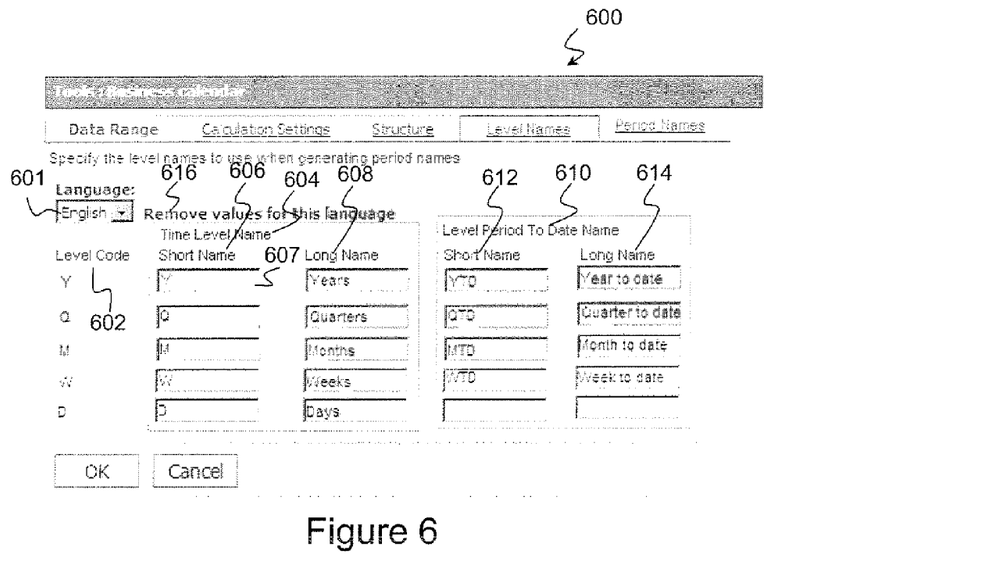
FIG. 6 shows a user interface for customizing the level names.

FIG. 6 is an example user interface 600 for specifying the names associated with the levels of a time dimension. The time period naming system 101 allows multi-language entry 601. The Level Code 602 can be used when reference to a specific Level is desired. The Level Short Name 606 specifies the short name of the Level. This name is produced by the level short name pattern component in a pattern. The Level Long Name 608 specifies the long name of the Level. This name is produced by the level long name pattern component in a pattern. The Level Period to Date 610 Short Name 612 specifies the period-to-date short name of the level. This name is produced by the period-to-date short name pattern component in a pattern. The Level Period to Date Long Name 614 specifies the long name of the level. After being specified in this way, this name is produced by the period-to-date long name pattern component in a pattern.

Figure 7:
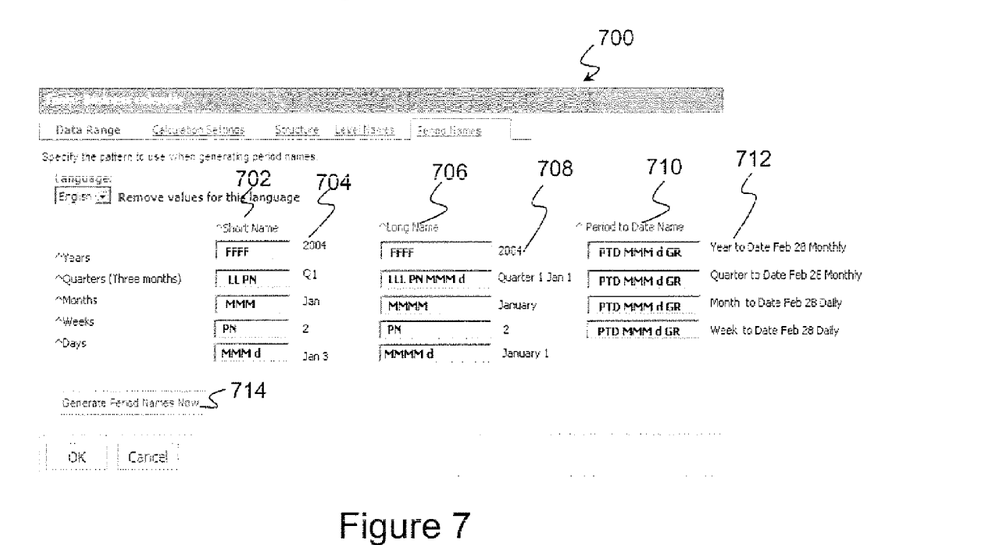
FIG. 7 shows a possible user interface for modify the patterns used to generate time period names.

Referring to FIG. 7 the time period naming system 101 provides the utility to the users to define or modify the patterns used to generate period names. This user interface 700 uses Short Name 702 to specify the pattern used to generate the period short name. The short name example field 704 displays an example of the period short name that will be generated using the specified pattern. The Long Name 706 specifies the pattern used to generate the more descriptive period long name, and the corresponding long name example 708 displays an example of the period long name that would be generated. Similarly, the period-to-date name 710 specifies the pattern used to generate the period to date name, and the period-to-date name example 712 displays an example of the period-to-date name that would be generated using that pattern.

This user interface 700 may further include a generate button 714 which executes the process to generate all period names based on the entered patterns.

Patterns are associated with levels of a dimension and are used to generate member names in that level.

In accordance with an embodiment of the present invention, in addition to existing patterns, new patterns may be added to produce period names for different contexts as needed.

Patterns can be stored and persisted in the data store 204 to allow business reporting to be performed by tools external to the one generating the period names.

As discussed above, patterns comprise pattern components, which are represented by symbols. There is a plurality of available pattern components for composing patterns to generate dimension names. Pattern components include non-limiting examples such as: member identifiers, names of ancestor levels; and literal text. Time dimension names include, for example but not limited to, member identifiers, names of ancestor periods; period relative numbers; cyclic period names; period-to-date names; formatted dates; fiscal years; Some exemplary pattern components are described in detail in the following.

The pattern component Member Identifier refers to a member. In the exemplary time period naming system, a Member Identifier references a time period. In one embodiment of the present invention, the symbol "AA" in a pattern produces the short form of the Member Identifier, and the symbol "AAA" in a pattern produces the long form of the Member Identifier. In the embodiment, short and long forms of a Member Identifier in each language can be stored in a language translation table keyed by a combination of the level and the Member Identifier. If no entries are present in the translation table, the short form and long form of the Member Identifier are identical.

In some cases, for example, in the exemplary time period naming system, the Member Identifier is a number representing a year, month day or week. In these cases, translation is not necessary. For example, if a Member Identifier were "2006", the symbol "AA" in the pattern component would produce the value "2006" which would normally not need translation. If the Member Identifier were a language specific name such as "Evening Shift" the symbol "AA" would produce the phrase "Evening Shift". Local language versions of both the long and short forms of the Member Identifier would normally be supplied in the translation table. The Member Identifier pattern component may further designate the identifier of a specific ancestor or a relative ancestor. In one embodiment, a period code and an underscore preceding the "AA" symbol (or "AAA" symbol) designates the identifier of the ancestor in the specific level. A number following the symbol designates a relative ancestor numbering upward from the level in which the pattern is specified. For example; Given a set of levels; Year, Quarter and Month; the sequence of symbols: "Year_AA" as a pattern component in the pattern for the month level would produce the short form of the identifier of the ancestor period in the year level. Similarly, the sequence of symbols "AA2" would produce the short form of the identifier of the grandparent period, in this case the Year. In the absence of explicit or relative level designations, the symbols "AA" and "AAA" indicate the short and long forms of the Period Identifier in the level for which the pattern is specified.

The pattern component Level Name produces the name of a level. In one embodiment, the symbol "LL" in a pattern produces the short name of a level and the symbol "LLL" in a pattern produces the long name of a level. The level name pattern component can designate a specific level or a relative level. In another embodiment, a level code and underscore preceding the "LL" symbol designates an explicit level and a number following the symbol designates a relative ancestor. In the exemplary time period naming system, the sequence of symbols. "Year-LL" would produce the level name of the year level. The sequence of symbols "LL2" would produce the name of the "grandparent" of the level. In the absence of explicit or relative level designations, the symbol "LL" indicates the name of the level in which the pattern is specified.

For an ordered dimension, the pattern component Member Relative Number produces a number which is the member's relative position among its siblings in relation to its parent or other specified ancestor. In the exemplary time period naming system, a Member Relative Number produces a number which is the time periods relative position among its siblings in relation to its parent or other specified ancestor. In one embodiment of the exemplary time period naming system, the symbol "NN" in a format produces a period relative number in relation to its parent time period. For example, if the Period 2005 in the level Year had 4 children periods Q1, Q2, Q3, and Q4, in that relative order, the period relative number for period Q3 in relation to the year 2005 would be 3.

Member Relative Number can designate a specific ancestor level or a relative ancestor level on which the numbering is based. In the exemplary time period naming system, a Member Relative Number can be implemented using a period code and an underscore preceding the "NN" symbol designates that the numbering is in respect to the specified ancestor level. A number following the symbol designates a relative ancestor. For example: Given a set of levels: Year, Quarter and Month; the sequence of symbols: "Year_NN" as a component in the pattern for the month level would produce a number for each month in relation to the ancestor period in the year level not in relation to the parent period in the quarter level. Similarly, the sequence of symbols "NN2" would produce the Member Relative Number in relation to the grandparent period. In the absence of explicit or relative level designations, the symbol "NN" indicates that period number in respect to the parent level therefore "NN" and "NN" produce an identical result.

Some ordered dimensions have Cyclic Member Names. For these ordered dimensions, the pattern component Cyclic Member Name produces the nth name from a set of cyclic names associated with a level where n is the member relative number. In one embodiment, short and long cyclic names can be stored in a language translation table keyed by the level code and the sequence number of the cyclic period name. In one embodiment, the symbol "XX" in a pattern produces the short form of a cyclic period name for the period and the symbol "XXX" in a pattern produces the long form of the Cyclic Member Name for the period. For example, in the level Shift, where a set of short cyclic period names were supplied as; "S1", "S2" and "S3"; and a set of long cyclic period names were supplied as "Morning Shift". "Afternoon Shift" and "Night Shift"; and where the level Shift were the child level of the level Day, the symbol "XXX" would produce "Night Shift" for the 3rd time period in the shift level under each day.

A Cyclic Member Name can designate a specific ancestor level or a relative ancestor level on which the numbering of periods is based. In one embodiment, a level identifier, for example, Year in Year_LLL as described in the seed data names, and an underscore preceding the "XX" (or "XXX") symbol designates that the numbering is in respect to the ancestor level indicated by the level code. A number following the symbol designates a relative ancestor counting upward. For example: Given a set of levels Year, Quarter and Month, The sequence of symbols: "Year XX" as a component in the pattern in the Month level would produce a cyclic period name based on a number for each Month in relation to the ancestor period in the Year level not in relation to the parent period in the Quarter level. Similarly the sequence of symbols "XX1" would produce the name of the 'parent" of the level. In the absence of explicit or relative level designations, the symbol XX indicates that numbering is in respect to the Parent Level. Therefore XX1 and XX produce the identical result.

The pattern component Period-to-Date produces the text string which represents a period-to-date. In one embodiment, the symbol "PP" in a pattern produces the period-to-date short name for a level and the symbol "PPP" in a pattern produces the period-to date long name for a level. For example if the period-to-date short name for the Month level is "MTD" then the pattern component PP would produce the text string "MTD".

Formatting dates for display based on formatting symbols are a common process in computerized reporting. Date formats provide a rich set of symbols for formatting of dates. Formatted dates can be used as pattern components in the generation of Period Names. In one embodiment that would be coded in the Java™ programming language, the set of symbols defined for Java™ simple date formats can be used as pattern components in a period name pattern. The set of formatting symbols in Java™ simple date formats are available at Sun Microsystems, Inc's website: http://java.sun.com/j2se/1.4.2/docs/api/java/text/SimpleDateFormat.html.

| Character | Meaning | Symbol Display Format | Example |
|---|---|---|---|
| G | era designator | Text | AD |
| y | Year | Number | 1996 |
| M | month in year | Text & Number | July & 07 |
| d | day in month | Number | 10 |
| h | hour in am/pm (1–12) | Number | 12 |
| H | hour in day (0–23) | Number | 0 |
| m | minute in hour | Number | 30 |
| s | second in minute | Number | 55 |
| S | Millisecond | Number | 978 |
| E | day in week | Text | Tuesday |
| D | day in year | Number | 189 |
| F | day of week in month | Number | 2 (2nd Wed in July) |
| w | week in year | Number | 27 |
| W | week in month | Number | 2 |
| a | am/pm marker | Text | PM |
| k | hour in day (1–24) | Number | 24 |
| K | hour in am/pm (0–11) | Number | 0 |
| z | time zone | Text | Pacific Standard Time |

The number of characters that form a symbol in Java™ simple date formats determines the format of the output For examples The following table summarizes these exemplary rules using the display format as defined in the previous tables:

| Symbol Display Format | Number of Characters in the Symbol | Result |
|---|---|---|
| Text | 1, 2 or 3 | Abbreviated form, if one exists |
| Text | 4 our more | full form |
| Number | minimum number of digits required in the displayed number | shorter numbers are padded with zeros (day in month could be '01' for day '1' if dd is used); (for a year, if the count of 'y' is 2, then the year is truncated to 2 digits); |

-continued

| Symbol Display Format | Number of Characters in the Symbol | Result |
|---|---|---|
| Text & Number | 1 or 2 | number form |
| Text & Number | 3 | text form |

Date formats can be based on the period start date or the period end date. The symbol "PS" can precede any set of date format symbols to indicate that period start date is to be used when constructing the name from the date format and the symbol "PE" can precede any set of date format symbols to indicate that period end date is to be used when constructing the name from the date format. In the absence of any preceding symbol, the start date will be used.

Both start and end dates can be used in the same pattern. For example, given a week which starts on Jan. 9, 2006 and ends on Jan. 13, 2006, the pattern "'Week From 'PSyyyy',' MMM dd 'To' PEyyyy ',' MMM dd" would produce the period name "Week From 2006 Jan. 9 To 2006 Jan. 13".

The pattern component FiscalYear produces the fiscal year in which the period exists. In one embodiment the symbols "FF" in a pattern would produce a two digit fiscal year and the symbol "FFFF" in a pattern would produce a four digit fiscal year. For example, if the first quarter of fiscal 2006 starts in calendar March 2005. "FFFF LLL NN" would show 2006 Quarter 1. Even though the time period is in calendar year 2005, "FF" would show 06. Fiscal Year is determined by the year of either the start date or end date of the fiscal year based on two parameters: The month of the start of the fiscal year and an indicator that the fiscal year is based on the starting or ending date. These parameters are available to name generators, but are not documented here.

Literal text can be included in a pattern component. The literal text is designated by enclosing in quotation marks. The literal text is included in names generated from the pattern. For example the pattern "Calendar Year" AAA would produce a name such as "Calendar Year 2005"

Period names generated from patterns on a customized basis, and predefined seed data used in construction of patterns for standard calendars such as Gregorian or manufacturing calendars, may be stored in a table. In one embodiment, this information is stored in a Language Text Table with the following columns and with sample data for a Gregorian calendar and the English Language.

| Code | Language | Type Count | LongName | ShortName | PeriodToDateName |
|---|---|---|---|---|---|
| Year | EN | Name | Year | Y | Year To Date |
| Quarter | EN | Name | Quarter | Q | Quarter To Date |
| Month | EN | Name | Month | M | Month To Date |
| Week | EN | Name | Week | W | Week To Date |
| Day | EN | Name | Day | D | Day To Date |

It should be apparent to a person skilled in the art that additional columns may be added as needed.

If periods in a level have cyclic names, the cyclic names can be included in the seed data defining the member names. When cyclic names exist, the definition of the names of the level indicate the number of names in the cycle.

For example, the definition and cyclic names for the 4 repeating members of a level called Season would be (in English):

| Season | EN | Name | 4 | Season | S | Season To Date |
| Season | EN | Member | 1 | Spring | Sp | |
| Season | EN | Member | 2 | Summer | Su | |
| Season | EN | Member | 3 | Fall | Fa | |
| Season | EN | Member | 4 | Winter | Wi | |

It should be apparent to a person skilled in the art that different words or characters can be used to represent the symbols without departing from the spirit of the present invention. For example, a syntax such as "M_LONG_PERIOD" may be defined to describe the long name for a month such as January, and "M_SHORT_LEVEL" may be used to define the short name of the month level.

In a system where calendars are predefined, it may be possible for the user to choose the levels from the calendar which they wish to use in their date dimension. A single set of patterns is supplied in seed data which must remain valid if levels are missing. To provide for this, pattern components may be grouped together. If any pattern component of a group produces an empty text, the entire group is omitted from the generated name. For example, in the pattern:

[AAA]{, [Quarter_"AAAA][Quarter-nnn]}

All of the pattern components defined within the braces { }, including the comma, will be omitted from the resulting period name if there is no level with the code Quarter defined in the calendar.

Although the exemplary embodiment of the present invention is shown in some cases with Gregorian calendar in English, this is solely for the purpose of ready understanding of the disclosure. A person skilled in the art would readily appreciate that the present invention can be easily adapted for use in other dimensions, in other time period naming systems with other calendars and/or other languages. All of the pattern components except those which are dependent on the underlying start and end dates can be applied to naming members of any hierarchical leveled dimension. Furthermore, the pattern components based on relative levels can function in multiple hierarchy dimensions by adding the Hierarchy name to indicate which path to use to determine parents and ancestors.

The invention can be implemented in digital electronic circuitry, or in computer hardware, firmware, software, or in combinations thereof. Apparatus of the invention can be implemented in a computer program product tangibly embodied in a machine-readable storage device for execution by a programmable processor; and method actions can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or an interpreted language. Suitable processors include, by way of example, both general and special purpose microprocessors. Generally, a processor will receive instructions and data from a read-only memory and/or a random access memory. Generally, a computer will include one or more mass storage devices for storing data files. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks, and CD-ROM disks. Any of the foregoing can be supplemented by, or incorporated in, ASICs (application-specific integrated circuits). Further, a computer data signal representing the software code which may be embedded in a carrier wave may be transmitted via a communication network. Such a computer readable memory and a computer data signal are also within the scope of the present invention, as well as the hardware, software and the combination thereof.

While particular embodiments of the present invention have been shown and described, changes and modifications may be made to such embodiments without departing from the true scope of the invention.

The invention claimed is:

1. A method comprising:
   in a programmable processor, receiving a pattern having a sequence of pattern components, and receiving a dimension member of a dimension, the dimension having a dimension hierarchy, the dimension member occurring in a level of the dimension hierarchy, and the dimension member having a context that includes an identifier, a parent of the dimension member, an ordered set of siblings having the same parent as the dimension member, and the level of the dimension hierarchy;
   interpreting the received sequence of pattern components within the context of the dimension member, wherein the sequence of pattern components represents the level of the dimension hierarchy in which the dimension member occurs, and wherein the sequence of pattern components further represents a relative position of the dimension member with respect to the ordered set of siblings; and
   generating, by the processor, a dimension member name as the identifier of the dimension member based on the interpretation of the received sequence of pattern components within the context of the dimension member in the level of the dimension hierarchy.

2. The method according to claim 1, wherein the dimension is an ordered dimension, and each of the dimension members represent a portion of a continuous measurement.

3. The method according to claim 2, wherein the ordered dimension is a time dimension with a member having a start time and an end time.

4. The method according to claim 1, wherein the pattern components are selected from the group consisting of a fiscal year, a period-to-date, a period number relative to the parent, a period number relative to an ancestor level, a member identifier, a level in which a time period resides, an identifier of the level, an identifier of an ancestor period, a cyclic member name, a literal text, a date format, and a combination thereof.

5. The method according to claim 1, wherein generating the dimension member name as the identifier of the dimension member comprises generating a name that is unique among the ordered set of siblings.

6. A dimension naming system comprising:
   a programmable processor;
   a receiver configured by the processor to receive a pattern having a sequence of pattern components, and receiving a dimension member of a dimension, the dimension having a dimension hierarchy, the dimension member occurring in a level of the dimension hierarchy, and the dimension member having a context that includes an identifier, a parent of the dimension member, an ordered set of siblings having the same parent as the dimension member, and the level of the dimension hierarchy;

an interpreter configured by the processor to interpret the sequence of pattern components received by the receiver within the context of the dimension member, wherein the sequence of pattern components represents the level of the dimension hierarchy in which the dimension member occurs, and wherein the sequence of pattern components further represents a relative position of the dimension member with respect to the ordered set of siblings; and a generator implemented by the processor to generate a dimension member name as the identifier of the dimension member based on the interpretation of the received sequence of pattern components within the context of the dimension member in the level of the dimension hierarchy.

7. The dimension naming system according to claim 6, wherein the dimension is a time dimension with the dimension member having a start time and an end time.

8. The dimension naming system according to claim 7, wherein the generator further comprises a period name generator.

9. The dimension naming system according to claim 6, wherein multiple patterns exist to produce multiple names for different purposes.

10. A dimension naming system according to claim 9 wherein the names include a long name, and a short name.

11. The dimension naming system according to claim 6, further comprising seed data names.

12. The dimension naming system according to claim 6, wherein the pattern is selected from the group consisting of a fiscal year, a period-to-date, a period number relative to the parent level, an alpha numeric name, a name of a level in which the time period resides, a name for a level, a name of an ancestor period, a name of a cyclic member, and a combination thereof.

13. The dimension naming system according to claim 6, wherein the generator generates the dimension member name as the identifier of the dimension member by generating a name that is unique among the ordered set of siblings.

14. A storage device readable by a computer encoding a computer program for execution by the computer to:

receive a pattern having a sequence of pattern components;

receive a dimension member of a dimension, the dimension having a dimension hierarchy, the dimension member occurring in a level of the dimension hierarchy, and the dimension member having a context that includes an identifier, a parent of the dimension member, an ordered set of siblings having the same parent as the dimension member, and the level of the dimension hierarchy;

interpret the received sequence of pattern components within the context of the dimension member, wherein the sequence of pattern components represents the level of the dimension hierarchy in which the dimension member occurs, and wherein the sequence of pattern components further represents a relative position of the dimension member with respect to the ordered set of siblings; and generate a dimension member name as the identifier of the dimension member based on the interpretation of the received sequence of pattern components within the context of the dimension member in the level of the dimension hierarchy.

15. The storage device according to claim 14, wherein the computer program is executable by the computer to generate the dimension member name as the identifier of the dimension member by generating a name that is unique among the ordered set of siblings.

* * * * *